(12) United States Patent
Yoo et al.

(10) Patent No.: US 11,411,524 B2
(45) Date of Patent: Aug. 9, 2022

(54) POWER CONVERSION SYSTEM AND CONTROL METHOD FOR VEHICLE MOTOR

(71) Applicants: Hyundai Motor Company, Seoul (KR); Kia Motors Corporation, Seoul (KR)

(72) Inventors: Tae Il Yoo, Geyonggi-do (KR); Jae Hyeon Lee, Gyeonggi-do (KR); Seong Min Kim, Gyeongsangnam-do (KR); Hyun Woo Noh, Seoul (KR); Han Hee Park, Hwaseong-si (KR); Ji Wan Cha, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/122,534

(22) Filed: Dec. 15, 2020

(65) Prior Publication Data

US 2021/0313924 A1 Oct. 7, 2021

(30) Foreign Application Priority Data

Apr. 3, 2020 (KR) .......................... 10-2020-0041083

(51) Int. Cl.
| | |
|---|---|
| *H02P 29/68* | (2016.01) |
| *H02M 1/00* | (2006.01) |
| *H02M 7/537* | (2006.01) |
| *H02M 1/32* | (2007.01) |
| *H02P 29/032* | (2016.01) |
| *B60L 3/00* | (2019.01) |
| *H02M 7/00* | (2006.01) |

(52) U.S. Cl.
CPC .............. *H02P 29/68* (2016.02); *B60L 3/003* (2013.01); *H02M 1/00* (2013.01); *H02M 1/327* (2021.05); *H02M 7/537* (2013.01); *H02P 29/032* (2016.02); *B60L 2240/36* (2013.01); *B60L 2240/525* (2013.01); *H02M 1/0009* (2021.05); *H02M 7/003* (2013.01)

(58) Field of Classification Search
CPC ...... H02M 1/327; H02M 1/32; H02M 1/0009; H02M 7/003; H02P 29/68; H02P 29/685; H02P 27/06; H02P 29/032; B60L 2240/525; B60L 2240/36; B60L 2240/425; B60L 3/003; B60L 3/06; Y02T 10/64; G01K 2205/00

See application file for complete search history.

(56) References Cited

U.S. PATENT DOCUMENTS

2020/0204061 A1* 6/2020 Minesawa ......... H02M 7/53876

* cited by examiner

*Primary Examiner* — Ryan Johnson
(74) *Attorney, Agent, or Firm* — Fox Rothschild LLP

(57) ABSTRACT

A power conversion system includes an inverter having a three-phase circuit including a plurality of power semiconductor devices and configured to supply driving power to a motor according to an applied torque command, and a controller configured to predict a maximum temperature of the inverter based on an actual measured temperature of any one of the plurality of power semiconductor devices and phase current of the motor, and to actively limit the torque command depending on the predicted maximum temperature of the inverter.

17 Claims, 9 Drawing Sheets

FIG. 1
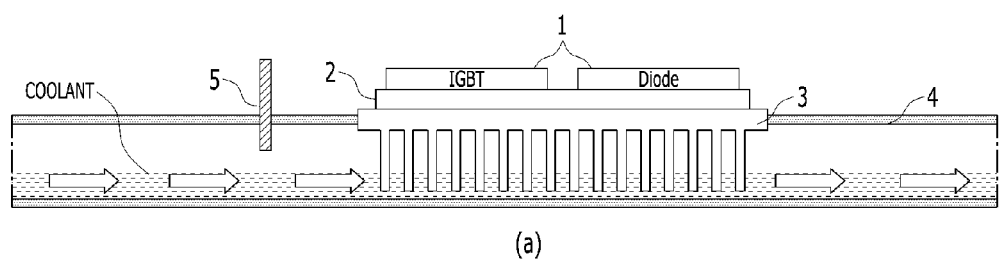
(a)
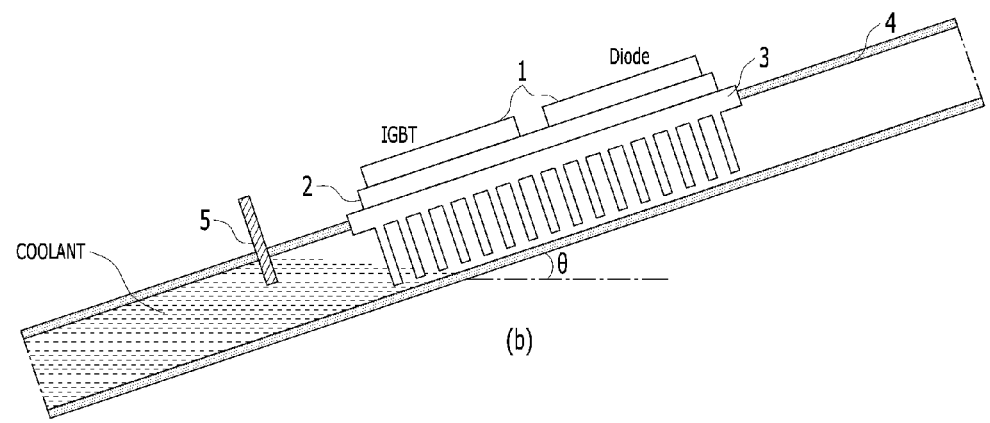
(b)

FIG. 8
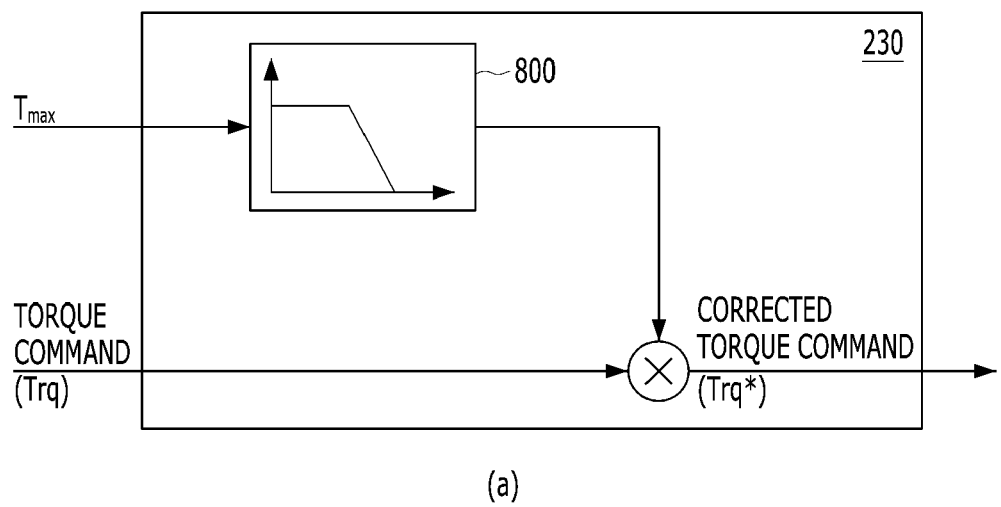
(a)
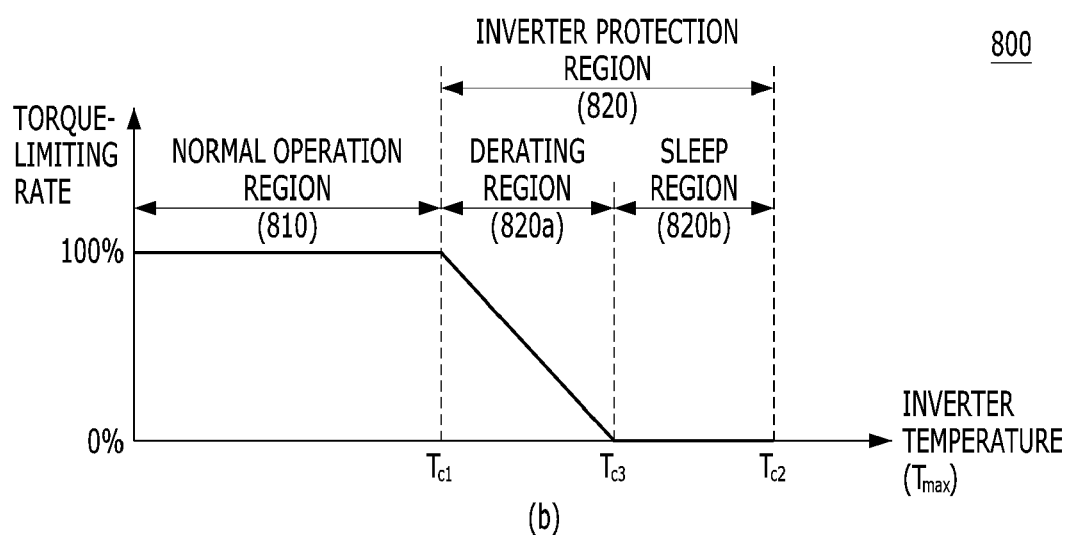
(b)

POWER CONVERSION SYSTEM AND CONTROL METHOD FOR VEHICLE MOTOR

This application claims under 35 U.S.C. § 119(a) the benefit of Korean Patent Application No. 10-2020-0041083, filed on Apr. 3, 2020, the entire contents of which are incorporated by reference herein.

BACKGROUND

(a) Technical Field

The present disclosure relates to a power conversion system and a control method, more particularly, to the power conversion system and control method configured to predict a maximum temperature of an inverter to perform control for preventing overheating.

(b) Description of the Related Art

In conjunction with continued demand for improvement of fuel efficiency of vehicles and increasingly stringent regulations on vehicle emissions in many countries, various types of environmentally friendly vehicles including electric vehicles (EVs), hybrid electric vehicles (HEVs), plug-in hybrid electric vehicles (PHEVs), and fuel-cell electric vehicles (FCEV) have been introduced.

In general, an inverter system, which has characteristics of high performance and high efficiency, is applied to an environmentally friendly vehicle in order to control driving of a motor that is a three-phase AC motor. The inverter system is a power conversion device for converting direct-current (DC) power of a battery into three-phase alternating-current (AC) power of a variable voltage and variable frequency through pulse-width modulation (PWM) switching and driving a motor as a power source, and includes a plurality of power modules installed therein, which function as switches and are installed at U, V, and W phases, respectively.

The power module included in the inverter system generates heat while performing a switching operation, and in particular, when a semiconductor junction of a device exceeds a temperature limit, the lifespan of the device is shortened and the device may be damaged, and thus there is a protection method for preventing overheating as well as an appropriate heat dissipation structure.

Accordingly, as shown in FIG. 1 (RELATED ART), a power module 1 including an insulated gate bipolar mode transistor (IGBT) and a diode may be disposed on a substrate 2, and a cooling fin 3 and a cooling channel 4 may be disposed below the substrate 2, and may dissipate heat generated by the power module 1 through circulation of coolant.

The inverter system may predict a temperature of the power module 1 based on a general temperature prediction model 20 shown in FIG. 2 (RELATED ART) in real time and may limit current transmitted to a motor before a semiconductor junction of the device reaches a temperature limit, thereby preventing overheating of the power module 1 due to conduction loss and switching loss.

Referring to FIG. 2, the general temperature prediction model 20 may convert three-phase current (which includes U-phase current, V-phase current, and W-phase current) flowing in the power module 1 of each phase into biaxial synchronous coordinate current (which includes a d-axis current $i_d$ and a q-axis current $i_q$) (S21), may calculate a magnitude Imag ($Imag=sqrt(i_d^2+i_q^2)$) of the synchronous coordinate current (S22), and may then calculate a loss value of the power module 1 using a preset loss curve map 21 (S23). Then, the power module 1 may calculate a temperature increase value attributable to current by multiplying the loss value by a thermal resistance coefficient (S24), may then add a coolant temperature measured through a temperature sensor 5 installed in the cooling channel 4, to the temperature increase value (S25), and may predict the temperature of an unspecified power module 1 in which the maximum current flows.

However, the temperature of the power module 1, which is predicted by the general temperature prediction model 20, is dependent upon a temperature of a coolant, and thus when an error occurs in measurement by the temperature sensor 5 due to the driving environment, it may be impossible to accurately predict a temperature.

For example, when the flow rate of coolant flowing in the cooling channel 4 is not sufficient (see FIG. 1(a)) or the flow of coolant is abnormal while a vehicle travels on an uphill road having a predetermined slope θ (see FIG. 1(b)), a thermal equilibrium state between the temperature of the coolant that contacts the temperature sensor 5 and the temperature of the coolant that contacts the cooling fin 3 is lost, and thus the temperature of the coolant, measured by the temperature sensor 5, is representative of the temperature of the cooling fin 3. That is, even if current flows in an inverter and the temperature of the power module 1 increases, since the temperature of the coolant that contacts the temperature sensor 5 does not increase therewith, only the temperature increase value attributable to current is applied to the predicted temperature of the power module 1, and thus the accuracy and the reliability of temperature prediction are lowered, and accordingly, the following problems occur.

First, when a predicted temperature of the power module 1 is lower than an actual temperature, loss due to overheating frequently occurs, and to prevent the same, when excess coolant circulates, usage of a pump for the coolant increases, and energy consumption efficiency is lowered.

Second, when the predicted temperature of the power module 1 is higher than an actual temperature, current is drastically limited before a temperature limit is reached, and thus the available driving time is reduced and power performance of a vehicle is also reduced while the vehicle travels on an uphill road having a steep slope, thus causing driver dissatisfaction.

SUMMARY

An object of the present disclosure is to provide a power conversion system and a control method for accurately predicting a maximum temperature of an inverter to perform control for preventing overheating in a manner that improves energy consumption efficiency and enables active response to changes in a driving environment without actual measuring temperatures of a plurality of power semiconductor devices included in respective phases of an inverter.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a power conversion system includes an inverter including a three-phase circuit including a plurality of power semiconductor devices and configured to supply driving power to a motor according to an applied torque command, and a controller configured to predict a maximum temperature of the inverter based on an actual measured temperature of any one of the plurality of power semiconductor devices and a phase current of the motor, and to actively limit the torque command depending on the predicted maximum temperature of the inverter.

The inverter may include a device temperature sensor installed at only one phase of the three-phase circuit and configured to detect the actual measured temperature of any one of the plurality of power semiconductor devices, a coolant temperature sensor configured to measure a temperature of a coolant circulating in a coolant channel included in the three-phase circuit, and a current sensor connected to a current path between the three-phase circuit and the motor and configured to detect the phase current of the motor.

The controller may include a device temperature prediction module electrically connected to at least one of the device temperature sensor, the coolant temperature sensor, or the current sensor, and a torque command limit module configured to perform adjustment to lower a torque command using a preset torque limit plot when the maximum temperature of the inverter is equal to or greater than a threshold value.

The device temperature prediction module may include a temperature estimator configured to estimate a first predicted temperature of each power semiconductor device based on the detected phase current of the motor and the measured temperature of the coolant, an error-map generator configured to generate an error map by accumulating an error between an actual measured temperature of a power semiconductor device included in a first leg, in which the device temperature sensor of the three-phase circuit is installed, and the first predicted temperature, and a temperature compensator configured to calculate a second predicted temperature by compensating for the first predicted temperature of a power semiconductor device of each of second and third legs adjacent to the first leg of the three-phase circuit, based on the error map.

The temperature estimator may calculate a power loss of each power semiconductor device corresponding to the detected phase current of the motor using a preset loss curve plot, may calculate a temperature increase value of each power semiconductor device attributable to current by applying a thermal resistance coefficient to the calculated power loss, and may estimate the first predicted temperature of each power semiconductor device in consideration of the measured temperature of the coolant in addition to the calculated temperature increase value.

The error-map generator may collect the plurality of errors calculated in real time and may classify a plurality of preallocated current sections, may select N pieces of data (N being an integer equal to or greater than 2) of the plurality of errors through sampling, and may generate an error map by calculating a representative error for the N pieces of data for each of the plurality of current sections.

The device temperature prediction module may include a maximum temperature determiner configured to compare the actual measured temperature of the power semiconductor device included in the first leg and the second predicted temperature of the power semiconductor device included in each of the second and third legs and to determine a maximum value thereamong as the maximum temperature of the inverter.

The torque command limit module may monitor the maximum temperature of the inverter, and may determine whether the inverter enters a derating region for gradually reducing the maximum torque of the motor and a sleep region for forcibly stopping a switching operation of the power semiconductor device.

The power conversion system may further include a switching signal output module configured to generate a switching signal for turning on and off the plurality of power semiconductor devices and to output the switching signal to the inverter according to the limited torque command.

A power conversion method may be applied to a power conversion system for a vehicle, the power conversion system comprising an inverter having a three-phase circuit including a plurality of power semiconductor devices and configured to supply driving power to a motor according to an applied torque command, the method comprising: predicting, by a controller, a maximum temperature of the inverter based on an actual measured temperature of any one of the plurality of power semiconductor devices and a phase current of the motor; and actively limiting, by the controller, the torque command depending on the predicted maximum temperature of the inverter.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 (RELATED ART) is a cross-sectional view of a power module to which a conventional water cooling method is applied;

FIG. 8(a) is a diagram for explaining an algorithm of an operation of a torque command limit module according to an embodiment of the present disclosure and FIG. 8(b) is a torque limit plot illustrating an example of setting of a normal operation region and an interval protection region.

DETAILED DESCRIPTION OF THE DISCLOSURE

Figure 2:
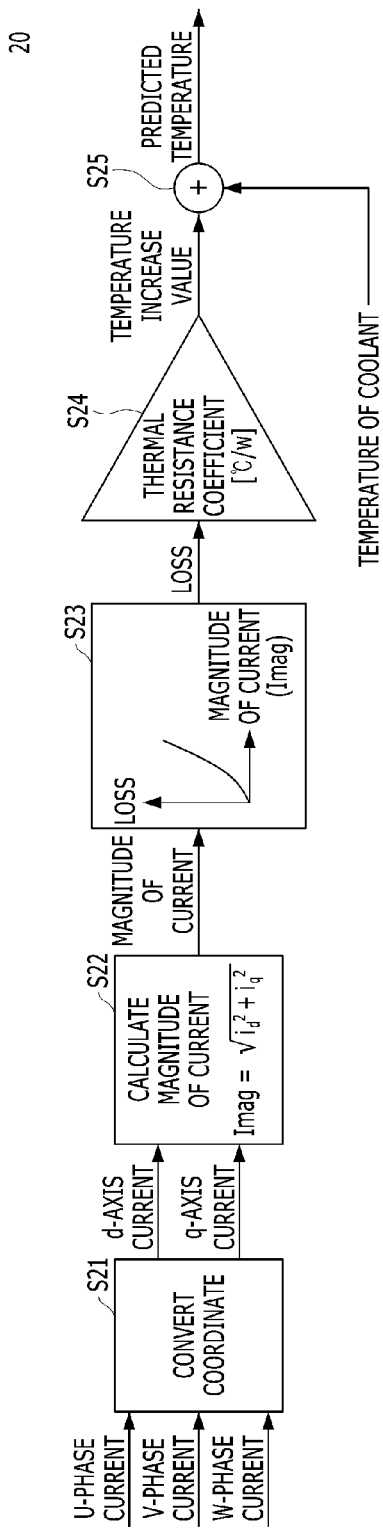
FIG. 2 (RELATED ART) is a diagram for explaining an algorithm of an operation for predicting the temperature of a power module using a conventional temperature prediction model.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments will be described in detail with reference to the attached drawings. The embodiments may, however, be embodied in many alternate forms and the disclosure should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the embodiments as defined by the claims.

The terms such as "first" and "second" are used herein merely to describe a variety of constituent elements, but the constituent elements are not limited by the terms. The terms are used only for the purpose of distinguishing one constituent element from another constituent element. In addition, terms defined in consideration of configuration and operation of embodiments are used only for illustrative purposes and are not intended to limit the scope of the embodiments.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a power conversion system according to an embodiment of the present disclosure will be described with reference to the accompanying drawings.

Figure 3:
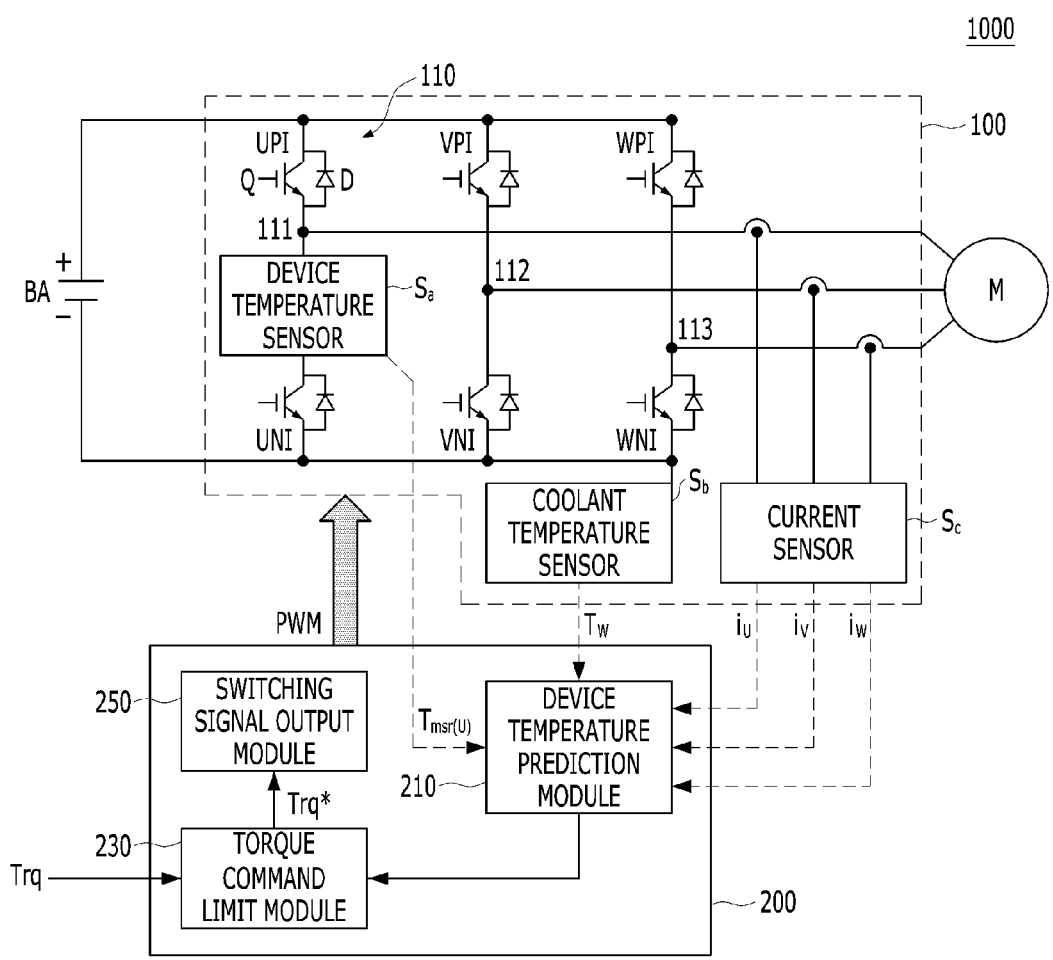
FIG. 3 is a schematic diagram showing the configuration of a power conversion system according to an embodiment of the present disclosure.

FIG. 3 is a schematic diagram showing the configuration of a power conversion system according to an embodiment of the present disclosure.

Referring to FIG. 3, an embodiment may include a battery BA for supplying high-voltage direct-current (DC) power, a motor M including a three-phase AC motor as a power source for driving a vehicle at a constant speed/acceleration, and a power conversion system 1000 for converting the direct-current (DC) power applied from the battery BA into three-phase alternating-current (AC) power of a variable voltage and variable frequency through a switching signal and transferring the same to the motor M.

The power conversion system 1000 may include an inverter 100 including a plurality of power semiconductor devices UPI, VPI, WPI, UNI, VNI, and WNI, and a controller 200 for generating a switching command in response to requested torque of the motor M and selectively controlling each of the power semiconductor devices UPI, VPI, WPI, UNI, VNI, and WNI in the inverter 100.

The inverter 100 may include a three-phase circuit 110, a cooler 120, a plurality of temperature sensors $S_a$ and $S_b$, and a current sensor $S_c$.

The three-phase circuit 110 may have a circuit portion (hereinafter referred to as a 'leg') in which positive arms UPI, VPI, and WPI and negative arms UNI, VNI, and WNI, which include a power semiconductor device, are connected in series, and three groups (U, V, and W phases) of legs 111, 112, and 113 may be configured in the form of a bridge.

The positive arms UPI, VPI, and WPI, which are positioned above the legs 111, 112, and 113, respectively, may be electrically connected to a positive (+) terminal of the battery BA, the negative arms UNI, VNI, and WNI, which are positioned thereunder, may be electrically connected to a negative (−) terminal of the battery BA, and the positive arms UPI, VPI, and WPI and the negative arms UNI, VNI, and WNI may be switched to be toggled between. For example, when three-phase AC power is output to the motor M according to a switching command, one of the positive arms UPI, VPI, and WPI or the negative arms UNI, VNI, and WNI of each of the legs 111, 112, and 113 may be electrically connected, and three of the power semiconductor devices may be electrically connected for the respective phases U, V, and W.

Here, a power semiconductor device included in each of the positive arms UPI, VPI, and WPI and the negative arms UNI, VNI, and WNI may include a switching device Q and a diode device D, which are connected in reverse parallel to each other in a pair.

The switching device Q may be turned on and off according to a switching command applied by the controller 200, and for example, may be a metal oxide semiconductor FET (MOSFET), an insulated gate bipolar mode transistor (IGBT), a rectification diode, a thyristor, a gate turn-off (GTO) thyristor, or a TRIAC.

The diode device D may form a current loop during power generation, and when the switching device Q is configured with an IGBT, the diode device D may be connected in parallel to each IGBT in such a way that current flows to a collector from an emitter of the IGBT.

The three-phase circuit 110 may include a device temperature sensor $S_a$ (hereinafter referred to as a first temperature sensor) for measuring an actual measured temperature $T_{msr}$ of a power semiconductor device included in a positive arm or a negative arm of any one of three groups of the legs 111, 112, and 113.

For example, the first temperature sensor $S_a$ may be installed in the first leg 111, corresponding to a U-phase part of the three groups of the legs 111, 112, and 113, and may detect an actual measured temperature $T_{msr(U)}$ of the power semiconductor device UPI or UNI and may transmit the same to the controller 200. However, this is merely exemplary and the first temperature sensor $S_a$ may also be installed in the second leg 112 corresponding to a phase V or the third leg 113 corresponding to a phase W.

Each of the power semiconductor devices UPI, VPI, WPI, UNI, VNI, and WNI included in the three-phase circuit 110 may be a heating device that is sensitive to temperature and there is concern over a problem in which the power semiconductor devices UPI, VPI, WPI, UNI, VNI, and WNI are damaged when the device is exposed to a high temperature for a predetermined temperature due to conduction loss and switching loss and semiconductor junction of the device exceeds a temperature limit.

To this end, the cooler 120 for dissipating heat generated from the power semiconductor devices UPI, VPI, WPI, UNI, VNI, and WNI may be disposed on a bottom surface of the three-phase circuit 110, which will be described below with reference to FIGS. 4(a) and 4(b).

Figure 4:
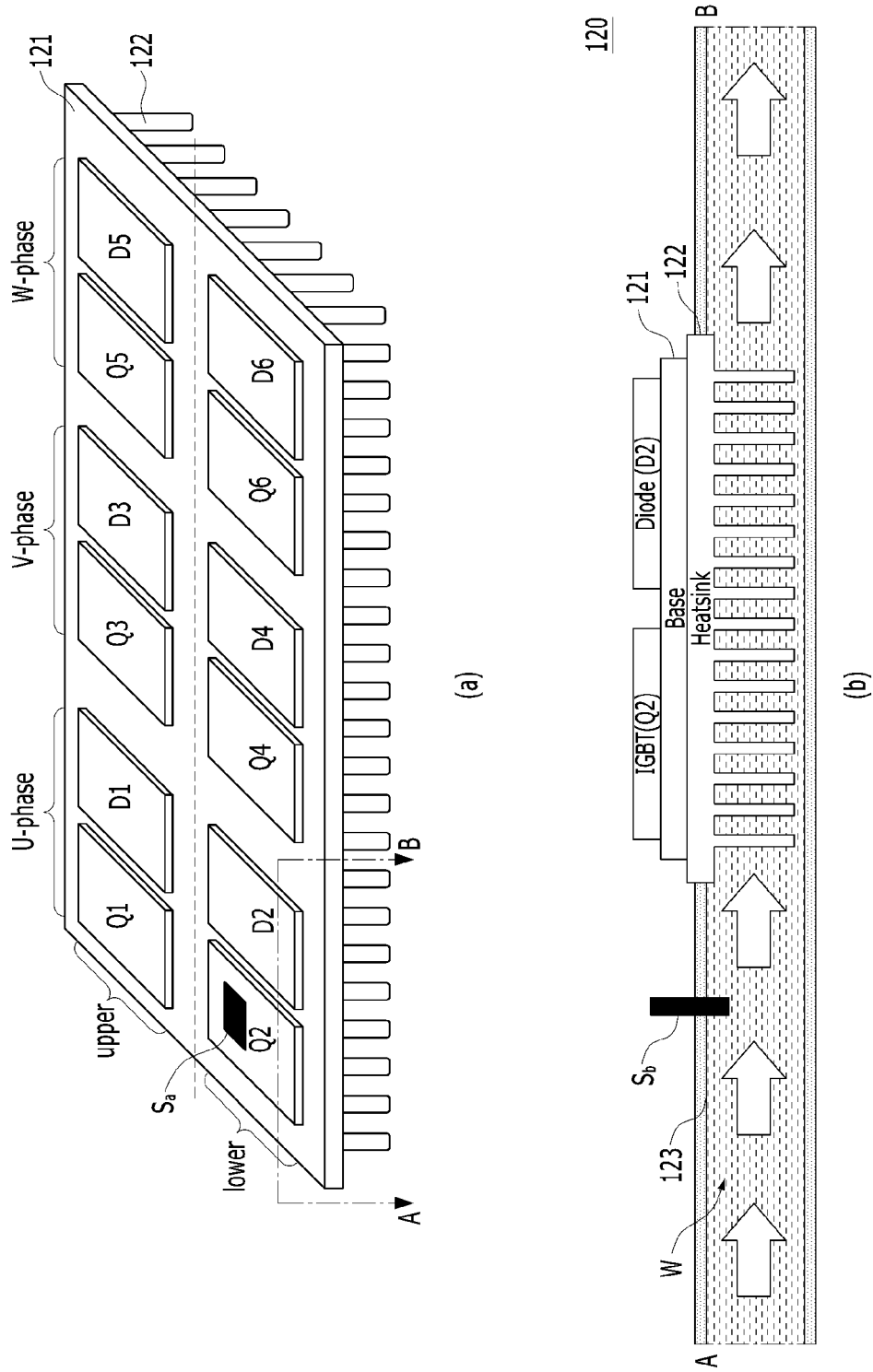
FIG. 4(a) is a perspective view showing a heat dissipation structure of an inverter according to an embodiment of the present disclosure.
FIG. 4(b) is a cross-sectional view taken along line A-B shown in FIG. 4(a)

FIG. 4(a) is a perspective view showing a heat dissipation structure of an inverter according to an embodiment of the present disclosure. FIG. 4(b) is a cross-sectional view taken along a line A-B shown in FIG. 4(a).

Referring to FIGS. 4(a) and 4(b), the cooler 120 may include a base 121, a plurality of cooling fins 122, a coolant channel 123, and a coolant temperature sensor $S_b$, which are disposed on a bottom surface of the three-phase circuit 110.

A conductive pattern (not shown) for electrical connection between the switching device Q and the diode device D may be formed in the base 121, and a power line may be embodied by the conductive pattern (not shown).

The plurality of cooling fins 122 may be designed to contact a coolant w that circulates in the coolant channel 123, and heat generated in each of the power semiconductor devices UPI, VPI, WPI, UNI, VNI, and WNI may be exchanged with the coolant w through the cooling fin 122 and may be dissipated to the outside.

The coolant channel 123 may be a channel for flow of the coolant w that circulates in a coolant pump (not shown), and a coolant temperature sensor $S_b$ (hereinafter referred to as a second temperature sensor) for directly measuring the temperature of the coolant w may be installed at one side of the coolant channel 123.

The second temperature sensor $S_b$ may directly measure the temperature of the coolant w that circulates in the coolant channel 123, may provide the measurement result to the controller 200, and may use the same to estimate a first predicted temperature $T_j$ of each of the power semiconductor devices UPI, VPI, WPI, UNI, VNI, and WNI, which will be described below.

Referring back to FIG. 3, the current sensor $S_c$ may be provided to measure phase currents $i_U$, $i_V$, and $i_W$ applied to the motor M from the inverter 100 through a switching operation of each of the power semiconductor devices UPI, VPI, WPI, UNI, VNI, and WNI.

The current sensor $S_c$ may be connected to a current path between the three groups of the legs 111, 112, and 113 and the motor M, and may include a plurality of unit current sensors. The number of unit current sensors included in the current sensor $S_c$ may correspond to the number of legs 111, 112, and 113, and the inverter 100 according to an embodiment may use a hall sensor as the current sensor $S_c$ including three of the unit current sensors.

The current sensor $S_c$ may provide the phase currents $i_U$, $i_V$, and $i_W$ detected for respective phases U to the controller 200 in real time.

The controller 200 may collect information provided from each of the plurality of temperature sensors Sa and Sb and the current sensor $S_c$ to predict the maximum temperature $T_{max}$ of the inverter 100, and may limit a torque command Trq applied from a high-ranking controller (not shown) to prevent each power semiconductor device from exceeding a temperature limit using the maximum temperature $T_{max}$ of the inverter 100 and a preset torque limit plot 800 (see FIG. 8(b)).

An input end of the controller 200 may be electrically connected to the first and second temperature sensors $S_a$ and $S_b$ and to the current sensor $S_c$, and an output end of the controller 200 may be electrically connected to each of the power semiconductor devices UPI, VPI, WPI, UNI, VNI, and WNI of the three-phase circuit 110. The controller 200 may include a device temperature prediction module 210, a torque command limit module 230, and a switching signal output module 250.

The device temperature prediction module 210 may predict the maximum temperature $T_{max}$ of the inverter 100 using the first predicted temperature $T_j$ of each power semiconductor device, estimated based on the phase currents $i_U$, $i_V$, and $i_W$ of the motor M and the temperature $T_w$ of the coolant w, and the actual measured temperature $T_{msr}$ of any one of the plurality of power semiconductor devices, which will be described below in detail with reference to FIGS. 5 to 7.

The torque command limit module 230 may correct the torque command Trq applied from a high-ranking controller (not shown) based on the maximum temperature $T_{max}$ of the inverter 100 received from the device temperature prediction module 210, and may transmit the corrected torque command Trq* to the switching signal output module 250 to perform control for preventing overheating by limiting the current flowing in each of the power semiconductor devices UPI, VPI, WPI, UNI, VNI, and WNI, which will be described below in more detail with reference to FIGS. 8(a) and 8(b).

The switching signal output module 250 may generate a switching signal (pulse-width modulation (PWM)) for turning on and off the plurality of power semiconductor devices UPI, VPI, WPI, UNI, VNI, and WNI included in the inverter 100 according to the corrected torque command Trq* received from the torque command limit module 230. As each of the power semiconductor devices UPI, VPI, WPI, UNI, VNI, and WNI of the inverter 100 is selectively turned on and off according to the switching signal PWM, the phase current corresponding to the corrected torque command Trq* may be applied to the motor M.

Hereinafter, a method of predicting the maximum temperature $T_{max}$ of the inverter 100 through the device temperature prediction module 210 will be described with reference to FIGS. 5 to 7.

Figure 5:
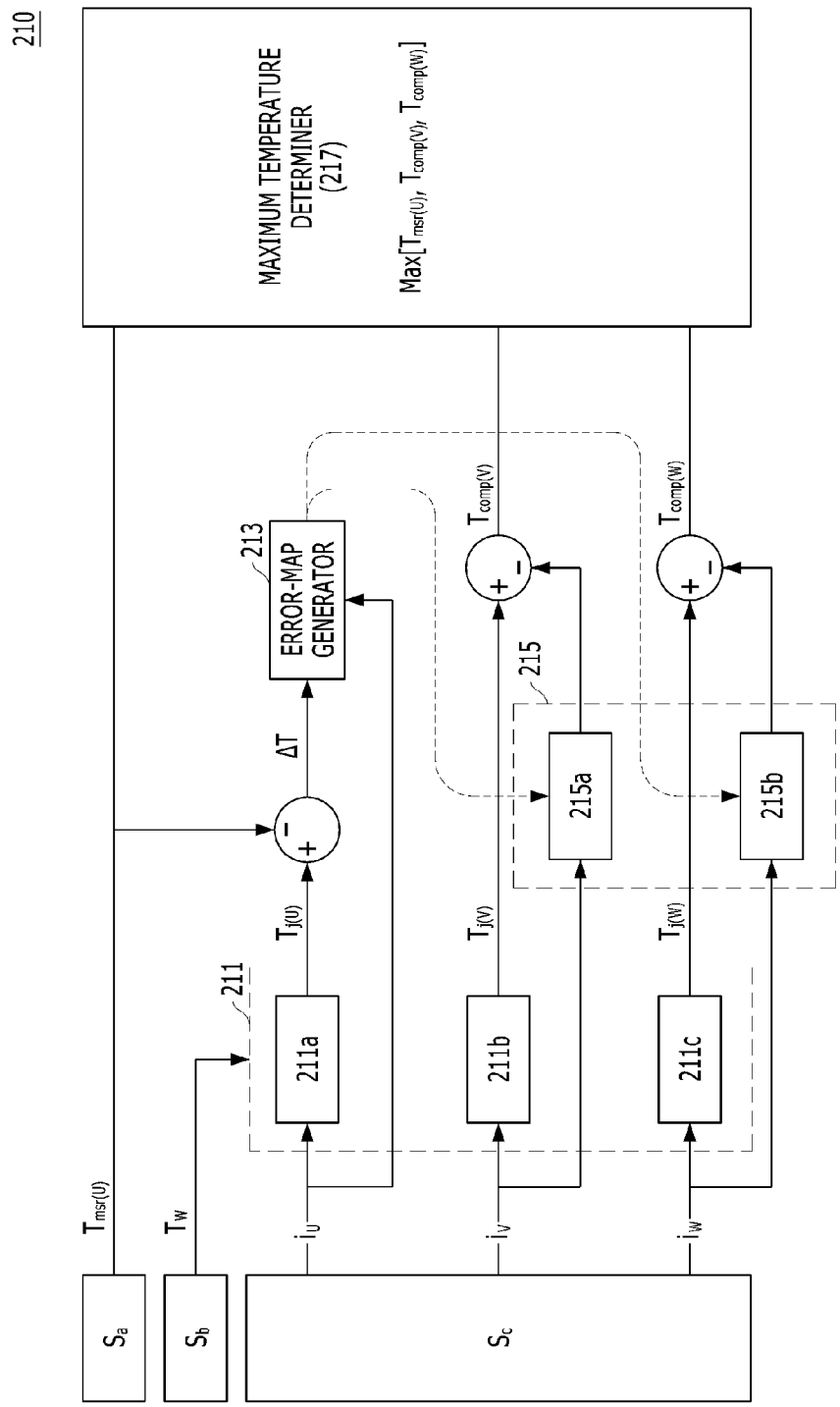
FIG. 5 is a schematic diagram showing the configuration of a device temperature prediction module according to an embodiment of the present disclosure.

FIG. 5 is a schematic diagram showing the configuration of a device temperature prediction module according to an embodiment of the present disclosure.

Referring to FIG. 5, the device temperature prediction module 210 may include a temperature estimator 211, an error-map generator 213, a temperature compensator 215, and a maximum temperature determiner 217.

The temperature estimator 211 may estimate first predicted temperatures $T_{j(U)}$, $T_{j(V)}$, and $T_{j(W)}$ of the power semiconductor devices (UPI, UNI), (VPI, VNI), and (WPI, WNI) based on the phase currents $i_U$, $i_V$, and $i_W$ of the motor M, measured by the current sensor $S_c$, and the temperature $T_w$ of the coolant w, detected by the second temperature sensor $S_b$. In this case, the temperature estimator 211 may include a plurality of unit elements 211a, 211b, and 211c corresponding to the respective legs 111, 112, and 113 of the inverter 100, or alternatively, may include a single unit 211 configured by integrating a plurality of unit elements, which will be described below in detailed with reference to FIG. 6.

Figure 7:
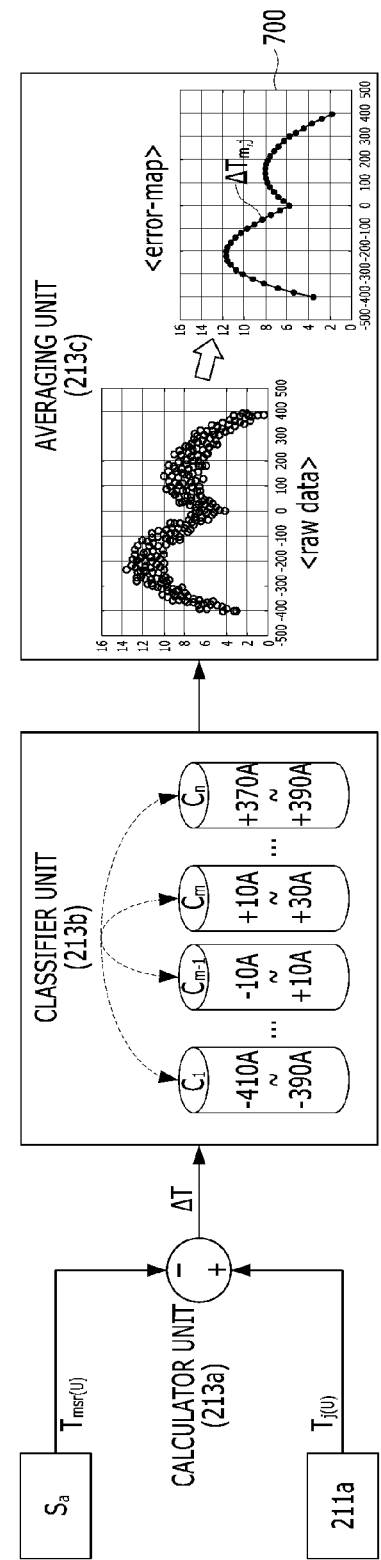
FIG. 7 is a diagram for explaining an algorithm of an operation of an error-map generator according to an embodiment of the present disclosure.

The error-map generator 213 may generate an error map by collecting errors $\Delta T$ between the first predicted temperature $T_{j(U)}$ and the actual measured temperature $T_{msr(U)}$ of a power semiconductor device of the positive arm UPI or the negative arm UNI of the first leg 111 in which the first temperature sensor $S_a$ is installed, in real time, and calculating a representative error $\Delta T_m$ through sampling of the plurality of collected errors $\Delta T$ for the plurality of respective preallocated current sections, which will be described below in more detail with reference to FIG. 7.

The temperature compensator 215 may compensate for the first predicted temperature $T_{j(V)}$ and $T_{j(W)}$ of power semiconductor devices included in the positive arms VPI and WPI and/or the negative arms VNI and WNI of the second and third legs 112 and 113 adjacent to the first leg 111 using an error map 700 (see FIG. 7) generated by the error-map generator 213. Here, the second and third legs 112 and 113 may indicate circuit units in which the first temperature sensor $S_a$ is not installed.

When receiving the phase currents $i_V$ and $i_W$ of phases V and W detected through the current sensor $S_c$, the temperature compensator 215 may calculate second predicted temperatures $T_{comp(V)}$ and $T_{comp(W)}$ by reading the error map 700 to extract a representative error $\Delta T_{m,i}$ corresponding to the phase currents $i_V$ and $i_W$, and compensating for the first predicted temperatures $T_{j(V)}$ and $T_{j(W)}$ of the power semiconductor devices (VPI, VNI) and (WPI, WNI), estimated by the temperature estimators 211b and 211c according to Equation 1 below.

[Equation 1]

$$T_{comp(V)} = T_{j(V)} - \Delta T_{m,iV} \quad (1)$$

$$T_{comp(W)} = T_{j(W)} - \Delta T_{m,iW} \quad (2)$$

Here, $T_{comp}$ indicates the corrected second predicted temperature, $T_j$ indicates the estimated first predicted temperature, $\Delta T_{m,i}$ indicates a representative error corresponding to the detected phase currents $i_V$ and $i_W$, V indicates the power semiconductor devices VPI and VNI corresponding to the phase V, and W indicates the power semiconductor devices WPI and WNI corresponding to the phase W.

As shown in Equation 2 below, the maximum temperature determiner 217 may compare the actual measured temperature $T_{msr(U)}$ of each of the power semiconductor devices corresponding to the respective phases U, V, and W of the three-phase circuit 110 and the second predicted temperatures $T_{comp(V)}$ and $T_{comp(W)}$, and may determine the maximum value thereamong as the maximum temperature $T_{max}$ of the inverter 100, and may provide the same to the torque command limit module 230.

$$T_{max} = \text{Max}[T_{msr(U)}, T_{comp(V)}, T_{comp(W)}] \quad \text{[Equation 2]}$$

Hereinafter, with reference to FIGS. 6 and 7, algorithms of the temperature estimator 211 and the error-map generator 213 will be described.

Figure 6:
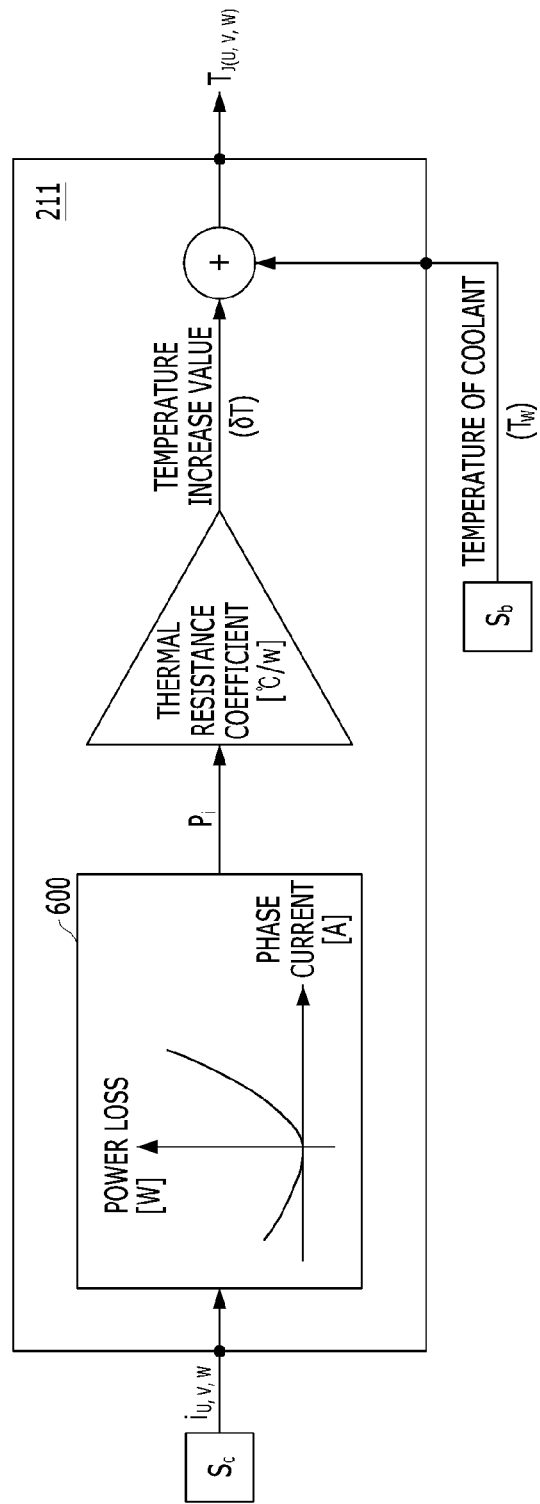
FIG. 6 is a diagram for explaining an algorithm of an operation of a temperature estimator according to an embodiment of the present disclosure.

FIG. 6 is a diagram for explaining an algorithm of an operation of a temperature estimator according to an embodiment of the present disclosure.

The temperature estimator 211 may detect phase currents $i_U$, $i_V$, and $i_W$ of the motor M, measured by the current sensor $S_c$, and may calculate power loss $P_i$ of each of the power semiconductor devices (UPI, UNI), (VPI, VNI), and (WPI, WNI) corresponding to the detected phase currents $i_U$, $i_V$, and $i_W$ using a preset loss curve plot 600.

The loss curve plot 600 may be derived by experimentation performed in advance through a driving test of the motor M, as the target that receives power, the x-axis, indicating the phase current I (of which unit is A) of the motor M, has a range between a negative peak and a positive peak due to the characteristics of AC current, and the y-axis, indicating the power loss $P_i$ (of which unit is W) of a power semiconductor device, is determined in consideration of a conduction loss and a switching loss, and always has a positive value, irrespective of the direction of the phase current i.

The temperature estimator 211 may calculate a temperature change $\delta T$ of each of the power semiconductor devices (UPI, UNI), (VPI, VNI), and (WPI, WNI) due to the phase currents $i_U$, $i_V$, and $i_W$ by multiplying the calculated power loss $P_i$ by the thermal resistance coefficient $R_{th}$ of the power semiconductor device.

Here, the temperature change $\delta T$ may refer to a temperature increase value of each of the power semiconductor devices (UPI, UNI), (VPI, VNI), and (WPI, WNI) at the time point at which DC power is applied to the inverter 100, and the thermal resistance coefficient $R_{th}$ may be a value that is preset depending on the unique characteristics of each of the power semiconductor devices (UPI, UNI), (VPI, VNI), and (WPI, WNI) and the heat dissipation characteristics of the cooler 120 and may have a unit of ° C./W.

The temperature estimator 211 may add the temperature $T_w$ of the coolant w, detected by the second temperature sensor $S_b$, to the calculated temperature change $\delta T$ of each of the power semiconductor devices (UPI, UNI), (VPI, VNI), and (WPI, WNI), and may estimate the first predicted temperature $T_j$ of each power semiconductor device using Equation 3 below.

$$T_j = \delta T + T_w = P_i R_{th} + T_w \quad \text{[Equation 3]}$$

Hereinafter, FIG. 7 is a diagram for explaining an algorithm of an operation of an error-map generator according to an embodiment of the present disclosure.

Referring to FIG. 7, the error-map generator 213 may include a calculator unit 213a, a classifier unit 213b, and an averaging unit 213c.

The calculator unit 213a may calculate an error $\Delta T$ ($\Delta T = T_{j(U)} - T_{msr(U)}$) between the actual measured temperature $T_{msr(U)}$ of the power semiconductor device UPI or UNI, detected by the first temperature sensor $S_a$, and the first predicted temperature $T_{j(U)}$ of the power semiconductor device UPI or UNI, estimated by the temperature estimator 211a.

The classifier unit 213b may allocate a plurality of current sections $C_1$ to $C_n$ (n being an integer equal to or greater than 2) based on upper and lower limits of phase current to be output and may classify the error $\Delta T$, which is calculated in real time by the calculator unit 213a, into current sections corresponding to the plurality of current sections $C_1$ to $C_n$.

For example, the classifier unit 213b may previously determine the upper limit (e.g., +390 A) and the lower limit (e.g., −410 A) of the phase current to be output by the inverter 100 in consideration of the rated voltage of the battery BA applied to a vehicle and the available driving range of the motor M, may equally divide the range between the upper limit and the lower limit depending on a preset offset (e.g., 20 A), and may allocate the plurality of current sections $C_1$ to $C_n$ to the ranges resulting from division. The phase current $i_U$ of the phase U, detected through the current sensor $S_c$, and the error ΔT calculated by the calculator unit 213a may be mapped to each other and may be classified into the corresponding current sections.

The classifier unit 213b may group a plurality of errors ΔT accumulated for the plurality of current sections $C_1$ to $C_n$, respectively, to generate raw data, and may store the raw data in a memory (not shown).

In this case, the memory (not shown) may store identification information on the first temperature sensor $S_a$ (e.g., which includes information on a phase (phase U) in which the first temperature sensor $S_a$ is installed, the leg 111, or the power semiconductor device UPI or NUI) and/or setting information of the current sections $C_1$ to $C_n$ (e.g., which includes information on upper and lower limits of phase current to be output, and offset information of each current section), which are preset by a developer. The memory (not shown) may be embodied in any one of storage media of a flash memory, a hard disk, a secure digital (SD) card, random access memory (RAM), read only memory (ROM), or a web storage.

The averaging unit 213c may process the raw data collected and classified by the classifier unit 213b and may calculate a representative error $\Delta T_{m,t}$ for each of the current sections $C_1$ to $C_n$ to generate the error map 700.

In particular, the averaging unit 213c may sample the plurality of errors ΔT stored in the memory (not shown) for the respective current sections $C_1$ to $C_n$ based on a predetermined selection reference and may calculate an average of N pieces of data (N being an integer equal to or greater than 2) selected based on the sampling to calculate the representative error $\Delta T_{m,t}$ for each of the current sections $C_1$ to $C_n$.

Here, the predetermined selection reference may be set to the specific revolution rate (e.g., 100 rpm) of the motor M and/or a specific detection time (e.g., 10 sec) of the current sensor $S_c$ to represent the current state, but the scope of the present disclosure is not limited thereto.

As described above, the device temperature prediction module 210 according to the embodiment shown in FIGS. 5 to 7 may accurately predict the temperature of each power semiconductor device without measurement of all actual measured temperatures corresponding to the respective phases U, V, and W of the inverter 100 included in the plurality of power semiconductor devices. In particular, based on the actual measured temperature $T_{msr}$ of the power semiconductor device included in any one of the three phases of the inverter 100, the first predicted temperature $T_j$ of the power semiconductor device included in the remaining two phases may be compensated for, and thus a measurement error of the coolant temperature sensor $S_b$, which occurs due to a change in the flow rate of the coolant w depending on the driving environment, may be reduced. Accordingly, the accuracy and the reliability of temperature prediction of each power semiconductor device may be remarkably improved compared with the general temperature prediction model 20 shown in FIG. 1.

As such, when the accuracy of temperature prediction of each power semiconductor device is high, even if a vehicle travels on an uphill road having a predetermined slope, an inverter may be prevented from being damaged due to overheating and may be capable of being operated with the maximum current just below the temperature limit, and thus the available driving range of the motor M, the power performance of the vehicle, and the time when the vehicle travels on an uphill road may all be improved. In particular, when the temperature prediction algorithm according to the present disclosure is used, the time in which the vehicle travels on an uphill road having a predetermined slope may be increased by as much as a level of about 40% compared with the conventional case.

The usage of a coolant pump may be minimized to prevent the inverter 100 from being damaged, and may be reduced by about 30% compared with the conventional case, and thus energy consumption efficiency may be improved, thereby enhancing fuel efficiency due to reduction in an electrical load.

Hereinafter, a method of limiting a torque command using the maximum temperature $T_{max}$, which is determined through the device temperature prediction module 210, will be described with reference to FIGS. 8(a) and 8(b).

FIG. 8(a) is a diagram for explaining an algorithm of an operation of a torque command limit module according to an embodiment of the present disclosure. FIG. 8(b) is a torque limit plot illustrating an example of setting of a normal operation region and an interval protection region.

The torque command limit module 230 may correct the torque command Trq applied from a higher-level controller (not shown) based on the maximum temperature $T_{max}$ of an inverter, received from the device temperature prediction module 210, and may prevent overcurrent from flowing in each of the power semiconductor devices UPI, VPI, WPI, UNI, VNI, and WNI based on the corrected torque command Trq*.

Referring to FIGS. 8(a) and 8(b), the torque command limit module 230 may monitor the maximum temperature $T_{max}$ of the inverter 100, which is provided in real time, and when the maximum temperature $T_{max}$ of the inverter 100 increases to a predetermined level or greater, the torque command Trq may be corrected to limit driving of the motor M, thereby preventing the inverter 100 from being damaged due to overheating.

First, the torque command limit module 230 may control the output torque of the inverter 100 depending on maximum torque in a normal operation region 810 in which the maximum temperature $T_{max}$ of the inverter 100 is equal to or less than a first threshold temperature $T_{c1}$.

Then, when the maximum temperature $T_{max}$ of the inverter 100 is equal to or greater than the first threshold temperature $T_{c1}$, the torque command limit module 230 may enter an inverter protection region 820 to reduce the maximum torque and to reduce rated output, and in the state in which the torque command limit module 230 enters the inverter protection region 820, the usage of the motor M remarkably reduces, and thus the temperature of the inverter 100 may be prevented from increasing further. Here, the first threshold temperature $T_{c1}$ may be a critical point, which is a reference for entry into the inverter protection region 820.

The inverter protection region 820 may include a derating region 820a for gradually reducing the maximum torque based on the maximum temperature $T_{max}$ of the inverter 100 and a sleep region 820b for forcibly stopping a switching operation of the inverter 100 before a second threshold temperature $T_{c2}$ is reached after the derating region 820a, and the torque command limit module 230 may prevent each power semiconductor device from being damaged due to overheating by actively limiting the output torque in the inverter protection region 820. Here, the second threshold temperature $T_{c2}$ may refer to a critical point at which each power semiconductor device is damaged.

According to the present disclosure, the torque command limit module 230 may preset a third threshold temperature $T_{c3}$ between the first and second threshold temperatures $T_{c1}$ and $T_{c2}$ to recognize the sleep region 820b based on the maximum temperature $T_{max}$ of the inverter 100, which is monitored in real time. Here, the third threshold temperature $T_{c3}$ may refer to a critical point at which a state transitions to the sleep region 820b from the derating region 820a, and the torque command limit module 230 may actively adjust the third threshold temperature $T_{c3}$ depending on a change in the driving environment. For example, the torque command limit module 230 may adjust the third threshold temperature $T_{c3}$ to be adjacent to the second threshold temperature $T_{c2}$ in order to ensure then available driving range of the motor M or a time in which a vehicle travels on an uphill road when the vehicle travels on an uphill road having a steep slope.

When the maximum temperature $T_{max}$ of the inverter 100 exceeds the first threshold temperature $T_{c1}$ and enters the first threshold temperature $T_{c1}$, the aforementioned torque command limit module 230 may output the corrected torque command Trq* by applying a torque-limiting rate α, calculated based on the torque limit plot 800 to the torque command Trq applied by an higher-level controller (not shown) according to Equation 4 below.

$$Trq^* = Trq \frac{\alpha}{100} \quad \text{[Equation 4]}$$

Here, the torque-limiting rate α may be a percentage that is set depending on the maximum temperature $T_{max}$ of the inverter 100 and may be set to reduce the torque command Trq in order to protect the inverter 100 in the range of 0% to 100%.

When the maximum temperature $T_{max}$ of the inverter 100 reaches the third threshold temperature $T_{c1}$, the torque command limit module 230 may set the torque command Trq* corrected according to a torque-limiting rate α (α=0%) of the sleep region 820b, to zero, and may stop, i.e., turn off, a switching operation of each power semiconductor device. Accordingly, current may not flow between the inverter 100 and the motor M, thereby preventing the temperature of the power semiconductor device from additionally increasing, and a sleep region 320b may be initiated prior to the time at which each power semiconductor device is damaged, thereby ensuring the stability of a vehicle.

Figure 9:
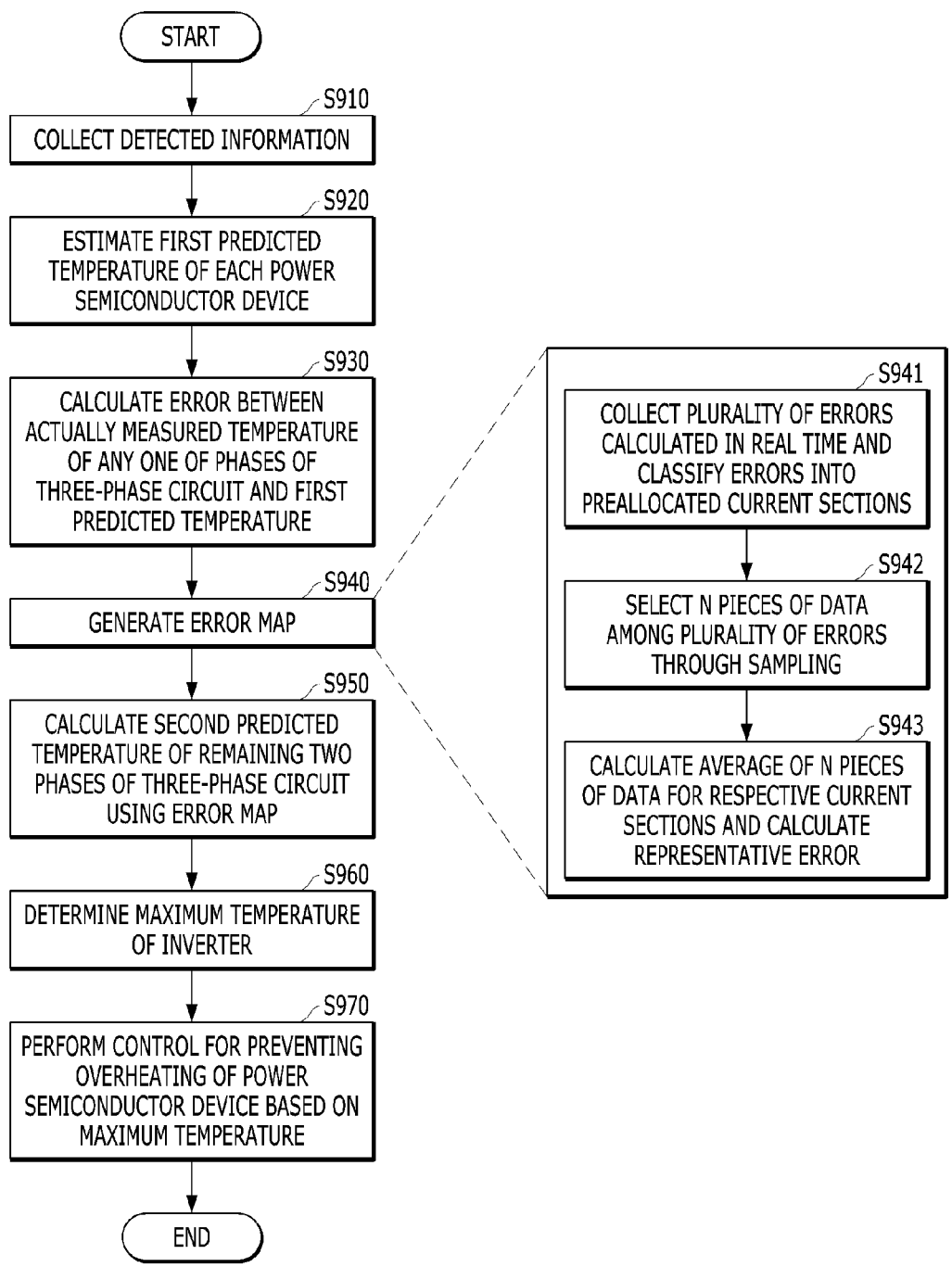
FIG. 9 is a flowchart for explaining a power conversion control method according to an embodiment of the present disclosure.

FIG. 9 is a flowchart for explaining a power conversion control method according to an embodiment of the present disclosure.

Referring to FIG. 9, a power conversion control method S900 may include step S910 of collecting detected information, step S920 of estimating a first predicted temperature of each power semiconductor device, step S930 of calculating an error between the first predicted temperature and the actual measured temperature of any one of three phases of a three-phase circuit, step S940 of generating an error map, step S950 of calculating a second predicted temperature of the remaining two phases of the three-phase circuit using the error map (S950), step S960 of determining the maximum temperature of an inverter, and step S970 of performing control for preventing overheating of the power semiconductor device based on the determined maximum temperature.

In step S910, the actual measured temperature $T_{msr(U)}$ of the power semiconductor device UPI or UNI included in any one of three phases of the three-phase circuit 110, the temperature $T_W$ of the coolant w circulating in the coolant channel 123, and the phase currents $i_U$, $i_V$, and $i_W$ of the motor M of the three-phase circuit 110, which are respectively detected through the first temperature sensor $S_a$, the second temperature sensor $S_b$, and the current sensor $S_c$, which are included in the inverter 100, may be collected.

In step S920, the first predicted temperatures $T_{j(U)}$, $T_{j(V)}$, and $T_{j(W)}$ of each of the power semiconductor devices (UPI, UNI), (VPI, VNI), and (WPI, WNI) may be estimated based on the phase currents $i_U$, $i_V$, and $i_W$ of the motor M and the temperature $T_w$ of the coolant w.

In step S930, an error ΔT between the detected actual measured temperature $T_{msr(U)}$ of the power semiconductor device UPI or UNI included in one phase and the estimated first predicted temperature $T_{j(U)}$ may be calculated.

In step S940, a plurality of errors ΔT that are calculated in real time may be collected and may be classified into a plurality of preallocated current sections (S941), N pieces of data (N being an integer equal to or greater than 2) may be selected through sampling (S942), and a representative error $ΔT_m$ may be calculated by calculating an average of the N pieces of data for each of the plurality of current sections (S943), and thus an error map may be generated.

In step S950, the second predicted temperatures $T_{comp(V)}$ and $T_{comp(W)}$ may be calculated by compensating for the first predicted temperature of the power semiconductor devices (VPI, VNI) and (WPI, WNI) included in the remaining two phases using the generated error map. Here, the compensated second predicted temperatures $T_{comp(V)}$ and $T_{comp(W)}$ may be calculated using a method of subtracting the representative error corresponding to the phase currents $i_V$ and $i_W$ detected in step S910 from the first predicted temperatures $T_{j(V)}$ and $T_{j(W)}$ estimated in step S920.

In step S960, the actual measured temperature $T_{msr(U)}$ of each of the power semiconductor devices corresponding to the respective phases of the three-phase circuit 110 and the second predicted temperatures $T_{comp(V)}$ and $T_{comp(W)}$ may be compared, and a maximum value thereamong may be determined as the maximum temperature $T_{max}$ of the inverter 100.

In step S970, the torque command Trq applied by an higher-level controller may be corrected based on the maximum temperature $T_{max}$ of the inverter, and overcurrent flowing in each of the power semiconductor devices UPI, VPI, WPI, UNI, VNI, and WNI may be limited based on the corrected torque command Trq*. For example, the maximum temperature $T_{max}$ of the inverter may be monitored in real time, whether the inverter enters the derating region 820a, in which the maximum torque of the motor M is gradually reduced, and the sleep region 820b, in which a switching operation of the power semiconductor device is forcibly stopped, may be determined, and control for preventing the inverter from being damaged due to overheating by applying the torque-limiting rate a in each entry region may be performed.

According to at least one embodiment of the present disclosure, based on the actual measured temperature of the power semiconductor device included in any one of the three phases of the inverter, the predicted temperature of the power semiconductor devices included in the remaining two phases may be compensated for, and a measurement error due to a change in the flow rate of coolant may be reduced, thereby improving the accuracy and the reliability of temperature prediction of each power semiconductor device.

Accordingly, even if a vehicle travels on an uphill road having a predetermined slope, the inverter may be capable of being operated with the maximum current just before the temperature limit, and thus the available driving range of the motor, the power performance of the vehicle, and the time in which the vehicle travels on an uphill road may all be improved.

The usage of a coolant pump may be minimized to prevent the inverter from damage, and thus energy consumption efficiency may be remarkably improved, thereby enhancing fuel efficiency due to reduction in an electrical load.

It will be appreciated by persons skilled in the art that the effects that could be achieved with the present disclosure are not limited to what has been particularly described hereinabove and other advantages of the present disclosure will be more clearly understood from the detailed description.

The aforementioned control method of electric power conversion according to embodiments can also be embodied as computer-readable code stored on a computer-readable recording medium. The computer-readable recording medium is any data storage device that can store data which can thereafter be read by a computer. Examples of the computer-readable recording medium include read-only memory (ROM), random-access memory (RAM), CD-ROM, magnetic tapes, floppy disks, optical data storage devices, etc.

The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While some examples have been shown in regard to embodiments, the embodiments may be implemented in various ways. The aforementioned embodiments may be combined with each other in various ways unless they are not incompatible and new embodiments may also be implemented therefrom.

Those skilled in the art will appreciate that the disclosure may be carried out in other specific ways than those set forth herein without departing from the spirit and essential characteristics of the disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A power conversion system for a vehicle, comprising:
    an inverter comprising a three-phase circuit comprising a plurality of power semiconductor devices and configured to supply driving power to a motor according to an applied torque command; and
    a controller configured to predict a maximum temperature of the inverter based on an actual measured temperature of any one of the plurality of power semiconductor devices and a phase current of the motor, and to actively limit the torque command depending on the predicted maximum temperature of the inverter, wherein the inverter comprises:
    a device temperature sensor installed at only one phase of the three-phase circuit and configured to detect the actual measured temperature of any one of the plurality of power semiconductor devices;
    a coolant temperature sensor configured to measure a temperature of a coolant circulating in a coolant channel included in the three-phase circuit; and
    a current sensor connected to a current path between the three-phase circuit and the motor, and configured to detect the phase current of the motor.

2. The power conversion system of claim 1, wherein the controller comprises:
    a device temperature prediction module electrically connected to at least one of the device temperature sensor, the coolant temperature sensor, or the current sensor; and
    a torque command limit module configured to perform adjustment to lower a torque command using a preset torque limit plot when the maximum temperature of the inverter is equal to or greater than a threshold value.

3. The power conversion system of claim 2, wherein the device temperature prediction module comprises:
    a temperature estimator configured to estimate a first predicted temperature of each power semiconductor device based on the detected phase current of the motor and the measured temperature of the coolant;
    an error-map generator configured to generate an error map by accumulating an error between an actual measured temperature of a power semiconductor device included in a first leg, in which the device temperature sensor of the three-phase circuit is installed, and the first predicted temperature; and
    a temperature compensator configured to calculate a second predicted temperature by compensating for the first predicted temperature of a power semiconductor device of each of second and third legs adjacent to the first leg of the three-phase circuit, based on the error map.

4. The power conversion system of claim 3, wherein the temperature estimator calculates a power loss of each power semiconductor device corresponding to the detected phase current of the motor using a preset loss curve plot, calculates a temperature increase value of each power semiconductor device attributable to current by applying a thermal resistance coefficient to the calculated power loss, and estimates the first predicted temperature of each power semiconductor device in consideration of the measured temperature of the coolant in addition to the calculated temperature increase value.

5. The power conversion system of claim 3, wherein the error-map generator collects the plurality of errors calculated in real time and classifies a plurality of preallocated current sections, selects N pieces of data of the plurality of errors through sampling, and generates an error map by calculating a representative error for the N pieces of data for each of the plurality of current sections, wherein the N is an integer equal to or greater than 2.

6. The power conversion system of claim 3, wherein the device temperature prediction module comprises a maximum temperature determiner configured to compare the actual measured temperature of the power semiconductor device included in the first leg and the second predicted temperature of the power semiconductor device included in each of the second and third legs and to determine a maximum value thereamong as the maximum temperature of the inverter.

7. The power conversion system of claim 2, wherein the torque command limit module monitors the maximum temperature of the inverter, and determines whether the inverter enters a derating region for gradually reducing the maximum torque of the motor and a sleep region for forcibly stopping a switching operation of the power semiconductor device.

8. The power conversion system of claim 1, further comprising a switching signal output module configured to generate a switching signal for turning on and off the plurality of power semiconductor devices and to output the switching signal to the inverter according to the limited torque command.

9. A power conversion control method of a power conversion system for a vehicle, the power conversion system comprising an inverter having a three-phase circuit including a plurality of power semiconductor devices and configured to supply driving power to a motor according to an applied torque command, the method comprising:
predicting, by a controller, a maximum temperature of the inverter based on an actual measured temperature of any one of the plurality of power semiconductor devices and a phase current of the motor; and
actively limiting, by the controller, the torque command depending on the predicted maximum temperature of the inverter,
wherein the invert comprises:
a device temperature sensor installed at only one phase of the three-phase circuit and configured to detect the actual measured temperature of any one of the plurality of power semiconductor devices;
a coolant temperature sensor configured to measure a temperature of a coolant circulating in a coolant channel included in the three-phase circuit; and
a current sensor connected to a current path between the three-phase circuit and the motor, and configured to detect the phase current of the motor.

10. The method of claim 9, wherein actively limiting the torque command comprises performing adjustment to lower a torque command using a preset torque limit plot when the maximum temperature of the inverter is equal to or greater than a threshold value.

11. The method of claim 10, wherein predicting the maximum temperature of the inverter comprises:
estimating a first predicted temperature of each power semiconductor device based on the detected phase current of the motor and the measured temperature of the coolant;
generating an error map by accumulating an error between an actual measured temperature of a power semiconductor device included in a first leg, in which the device temperature sensor of the three-phase circuit is installed, and the first predicted temperature; and
calculating a second predicted temperature by compensating for the first predicted temperature of a power semiconductor device of each of second and third legs adjacent to the first leg of the three-phase circuit, based on the error map.

12. The method of claim 11, wherein estimating the first predicted temperature comprises:
calculating a power loss of each power semiconductor device corresponding to the detected phase current of the motor using a preset loss curve plot;
calculating a temperature increase value of each power semiconductor device attributable to current by applying a thermal resistance coefficient to the calculated power loss; and
estimating the first predicted temperature of each power semiconductor device in consideration of the measured temperature of the coolant in addition to the calculated temperature increase value.

13. The method of claim 11, wherein generating the error map comprises:
collecting a plurality of errors calculated in real time and classifying a plurality of preallocated current sections;
selecting N pieces of data of the plurality of errors through sampling; and
generating an error map by calculating a representative error for the N pieces of data for each of the plurality of current sections,
wherein the N is an integer equal to or greater than 2.

14. The method of claim 11, wherein predicting the maximum temperature of the inverter comprises:
comparing the actual measured temperature of the power semiconductor device included in the first leg and the second predicted temperature of the power semiconductor device included in each of the second and third legs and determining a maximum value thereamong as the maximum temperature of the inverter.

15. The method of claim 10, wherein actively limiting the torque command comprises monitoring the maximum temperature of the inverter and determining whether the inverter enters a derating region for gradually reducing the maximum torque of the motor and a sleep region for forcibly stopping a switching operation of the power semiconductor device.

16. The method of claim 9, further comprising:
generating a switching signal for turning on and off the plurality of power semiconductor devices and outputting the switching signal to the inverter according to the limited torque command.

17. A non-transitory computer-readable recording medium containing program instructions executed by a processor, the recording medium comprising:
program instructions that predict a maximum temperature of an inverter having a three-phase circuit and configured to supply driving power to a motor according to an applied torque command, the maximum temperature of the inverter being predicted based on an actual measured temperature of any one of a plurality of power semiconductor devices and a phase current of the motor; and
program instructions that actively limit the torque command depending on the predicted maximum temperature of the inverter,
wherein the inverter comprises:
a device temperature sensor installed at only one phase of the three-phase circuit and configured to detect the actual measured temperature of any one of the plurality of power semiconductor devices;
a coolant temperature sensor configured to measure a temperature of a coolant circulating in a coolant channel included in the three-phase circuit, and
a current sensor connected to a current path between the three-phase circuit and the motor, and configured to detect the phase current of the motor.

* * * * *